UNITED STATES PATENT OFFICE.

ROBERT M. COLE, OF SANDUSKY, OHIO.

METHOD OF OBTAINING A SODIUM SALT FROM A HYDROCARBON MONOSULFONIC ACID.

1,396,320.     Specification of Letters Patent.     Patented Nov. 8, 1921.

No Drawing.     Application filed December 3, 1919. Serial No. 342,292.

*To all whom it may concern:*

Be it known that I, ROBERT M. COLE, a citizen of the United States of America, and a resident of Sandusky, county of Erie, and State of Ohio, have invented certain new and useful Improvements in Methods of Obtaining a Sodium Salt from a Hydrocarbon Monosulfonic Acid, of which the following is a specification.

The main objects of this invention are to provide an improved process for obtaining a sodium salt from an aromatic hydrocarbon monosulfonic acid; to provide a process of this character which is materially less expensive in its operation and much more effective in its results than any of the processes heretofore practised; and to provide an improved process of the aforesaid character which is particularly suitable in producing a sodium salt of the particular aromatic hydrocarbon monosulfonic acid from which a phenol may be readily obtained by fusing said salt with an alkali and neutralizing with a mineral acid.

This improved process involves the sulfonation of an aromatic hydrocarbon and the treatment thereof with the highly ionizable salt for the purpose of precipitating sodium hydrocarbon sulfonate which, after further treatment to be more particularly hereafter pointed out, is in condition to be fused with caustic soda and then neutralized with a mineral acid to produce the corresponding phenol.

The first step in carrying out this improved process is to provide a sulfonation mixture obtained in the usual manner by the combination of the desired aromatic hydrocarbon and sulfuric acid. A reaction takes place, and an aromatic hydrocarbon sulfonic acid is produced so that the mixture then comprises the hydrocarbon, sulfuric acid and the particular aromatic hydrocarbon sulfonic acid. An essential feature of the sulfonation mixture is the control of the comparative amounts of the reacting components in such a way that, upon the addition of highly ionizable salts or salt solution, the free mineral acid in the solution is rendered sufficiently inactive to prevent the precipitation of sodium hydrocarbon sulfonate. This condition of the sulfonation mixture is most readily accomplished by having an excess of the hydrocarbon.

The second step in carrying out this improved process, is to add to the sulfonation mixture a highly ionizable salt, preferably in solution, such as sodium chlorid, potassium chlorid, etc. Sodium chlorid has been found to be the most suitable salt for this purpose. Because of this excess of hydrocarbon, the addition of this salt solution to the sulfonation mixture brings about a reaction of a double decomposition type leaving a free hydrocarbon, a solution of free sulfuric acid, hydrochloric acid, sodium chlorid and sulfate, and a bulky precipitate of sodium hydrocarbon sulfonate.

The subsequent steps in the process are more or less general and well known. These consist in filter-pressing the precipitate, purifying, drying and grinding the same, after which it may be fused with an alkali such as caustic soda, which, upon a subsequent neutralization of a mineral acid, will yield a phenol.

The commercial process heretofore in general use for accomplishing this same purpose, consists essentially in the sulfonation of the hydrocarbon with sulfuric acid, liming the same with a calcium hydrate or carbonate in an aqueous emulsion, filtration of the calcium sulfate solution from the calcium sulfate precipitate, subsequent treatment of the latter solution with soda ash, filtration of the sodium hydrocarbon sulfonate solution from the calcium carbonate precipitate, and finally the evaporation of said latter solution in order to obtain the dry sodium salt suitable for caustic fusion. This process, however, is not only long and laborious, but is wasteful of material. Furthermore, this process does not produce a pure sodium salt for the reason that during the evaporation process many of the undesirable products in solution, such as mineral acids, tars, the more soluble sulfonates, etc., all go down to dryness in conjunction with the sodium sulfonate.

The improved process, already described, has the advantage over the present commercial process, in that the precipitation by salting the sulfonation mixture is accomplished in a very short space of time and with a small amount of labor. It also has the advantage of producing a very pure sodium salt for the reason that the impurities, such as mineral acids, tars, and the more soluble sulfonates, above mentioned, remain in the solution.

The foregoing improved process is particularly applicable, and has been followed out on a substantial scale, for obtaining carvacrol from para-cymene. However, it is equally suitable for the production of sodium salts monosulfonic acids from other aromatic hydrocarbon from which the resulting phenol may be obtained.

Although but one specific method of following out this process is herein described, it will be understood that some of the steps thereof may be altered or varied without departing from the spirit of the invention as defined by the following claims.

I claim:

1. The improved process of obtaining a precipitation of a sodium hydrocarbon sulfonate, which consists in the sulfonation of an aromatic hydrocarbon in the presence of an excess of hydrocarbon and then adding thereto a highly ionizable salt.

2. The improved process of obtaining a precipitation of a sodium hydrocarbon sulfonate, which consists in the sulfonation of an aromatic hydrocarbon in the presence of an excess of the hydrocarbon and then gradually mixing such a sulfonation mixture with a highly ionizable salt solution.

Signed at Sandusky this 29th day of November, 1919.

ROBT. M. COLE.